No. 754,718. PATENTED MAR. 15, 1904.
J. F. STEWARD.
HEADBOARD FOR HARVESTERS.
APPLICATION FILED OCT. 8, 1903.
NO MODEL.

Witnesses:
G. H. Alfreds.
J. C. Warnes.

Inventor.
John F. Steward.

THE NORRIS PETERS CO., PHOTO-LITHO., WASHINGTON, D. C.

No. 754,718. Patented March 15, 1904.

UNITED STATES PATENT OFFICE.

JOHN F. STEWARD, OF CHICAGO, ILLINOIS, ASSIGNOR TO INTERNATIONAL HARVESTER COMPANY, OF CHICAGO, ILLINOIS, A CORPORATION OF NEW JERSEY.

HEADBOARD FOR HARVESTERS.

SPECIFICATION forming part of Letters Patent No. 754,718, dated March 15, 1904.

Application filed October 8, 1903. Serial No. 176,208. (No model.)

*To all whom it may concern:*

Be it known that I, JOHN F. STEWARD, a citizen of the United States, residing at Chicago, in the county of Cook and State of Illinois, have invented a new and useful Improvement in Headboards for Harvesters, of which the following is a complete specification.

This invention has for its object the construction of a headboard simple and light in design and adapted to automatically adjust itself to meet the requirements of either tall or short grain.

I am aware that it is not new to hinge a headboard to a support above the grain-passage and lock it in a definite position; but, as far as known to me, it is new to hinge a headboard above the grain-passage or to the grain-cover and permit it to swing freely in a substantially vertical plane except in so far as the grain forces the board from such a position.

Figure 1:
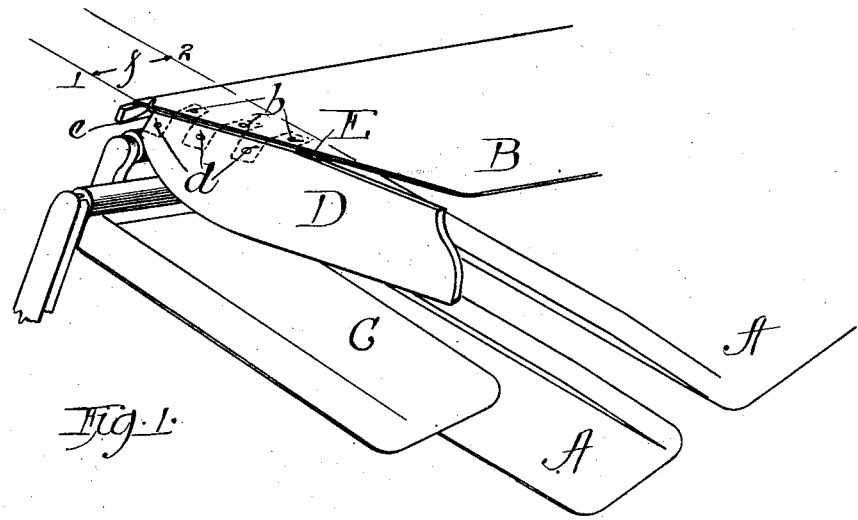
Figure 2:
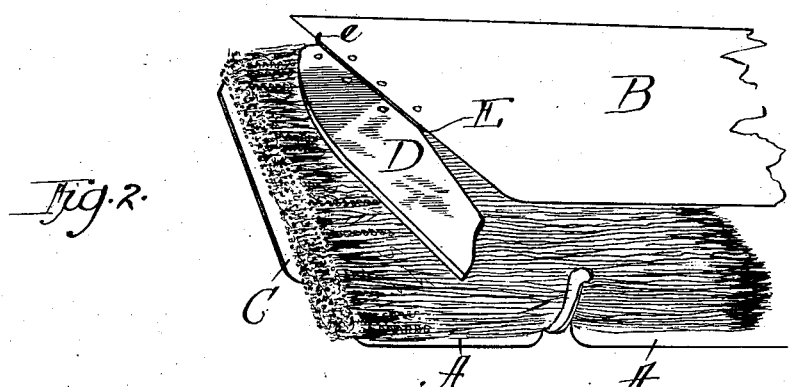

Referring to the drawings, Figure 1 represents a perspective of the headboard and that portion of a harvester-deck and grain-cover adjacent thereto; and Fig. 2 is a perspective similar to that shown in Fig. 1, but with the headboard as it appears when grain is passing thereunder.

In the drawings, A represents the grain-deck of a harvester, B the grain-cover, and C the deck extension. D designates the headboard hinged to the grain-cover B, the hinge connection being preferably effected by means of the straps *b* on the said grain-cover, the straps *d* on the headboard and the rod E forming the axis of said hinge. The rod E is provided with a bent end *e* to facilitate the withdrawal and insertion of same.

The upper free edge of the headboard is rounded, as shown, in order that no obstruction may be offered to the free passage of the long grain thereunder, and this upper rounded edge is made practically continuous with the upper side of the grain-cover.

In operation in short grain the headboard D hangs substantially in a vertical plane, the heads of the grain being retarded somewhat by the lower end of the board. In longer grain, however, the heads operate to raise the board, while the board acts to properly retard the heads and confine the loose fluffy grain, as shown in Fig. 2.

The headboard D occupies an angular position relative to a line transverse of the deck, the extent of this angular displacement *f* being represented by the line 1 2 in Fig. 1. The result of this angular position of the board will be to render it effective in retarding the heads of the grain for a greater distance both transversely and longitudinally upon and with respect to the length thereof.

What I claim as my invention, and desire to secure by Letters Patent, is—

1. In a harvester, in combination, a grain-cover and a deck forming a grain passage-way, and an automatically-operated headboard hinge-connected above said passage-way and at the rear end thereof in a position to diagonally traverse in a downward and forward direction the said grain passage-way and free to yield to the grain passing therethrough, substantially as described.

2. In a harvester, in combination, a grain-cover and a deck forming a grain passage-way, and an automatically-operated headboard hinge-connected to the rear end of said grain-cover in a position to diagonally traverse in a downward and forward direction the said grain passage-way and free to yield to the grain passing therethrough, substantially as described.

JOHN F. STEWARD.

In presence of—
D. E. LOCKERT,
J. C. WARNES.